US012270128B2

(12) United States Patent
Schirk et al.

(10) Patent No.: US 12,270,128 B2
(45) Date of Patent: Apr. 8, 2025

(54) METHOD FOR PRODUCING LYOCELL STAPLE FIBERS

(71) Applicant: LENZING AKTIENGESELLSCHAFT, Lenzing (AT)

(72) Inventors: Christian Schirk, Gmunden (AT); Christoph Schrempf, Bad Schallerbach (AT); Franz Gugerell, Loosdorf (AT)

(73) Assignee: LENZING AKTIENGESELLSCHAFT, Lenzing (AT)

( * ) Notice: Subject to any disclaimer, the term of this patent is extended or adjusted under 35 U.S.C. 154(b) by 336 days.

(21) Appl. No.: 17/632,081

(22) PCT Filed: Jul. 29, 2020

(86) PCT No.: PCT/EP2020/071378
§ 371 (c)(1),
(2) Date: Feb. 1, 2022

(87) PCT Pub. No.: WO2021/023594
PCT Pub. Date: Feb. 11, 2021

(65) Prior Publication Data
US 2022/0275537 A1    Sep. 1, 2022

(30) Foreign Application Priority Data
Aug. 2, 2019    (EP) .................................... 19189737

(51) Int. Cl.
*D01F 2/00*    (2006.01)
*B29C 48/05*    (2019.01)
(Continued)

(52) U.S. Cl.
CPC ................ *D01F 2/00* (2013.01); *B29C 48/05* (2019.02); *D01F 11/02* (2013.01); *D04H 1/4258* (2013.01);
(Continued)

(58) Field of Classification Search
CPC ... D01B 2201/22; D04H 1/4258; D01F 11/02; D01F 2/00; B29K 2001/08; B29C 48/05
See application file for complete search history.

(56) References Cited

U.S. PATENT DOCUMENTS

| 4,246,221 A | 1/1981 | McCorsley, III |
| 5,310,424 A * | 5/1994 | Taylor ....................... D01F 2/00 8/549 |

(Continued)

FOREIGN PATENT DOCUMENTS

| CN | 1826435 A | 8/2006 |
| CN | 203403200 U | 1/2014 |

(Continued)

OTHER PUBLICATIONS

Bechtold, Thomas, et al. "Ion-interactions as driving force in polysaccharide assembly." Carbohydrate polymers 93.1 (Jan. 27, 2012): 316-323. (Year: 2012).*

(Continued)

*Primary Examiner* — Benjamin A Schiffman
(74) *Attorney, Agent, or Firm* — Venable LLP

(57) ABSTRACT

The invention relates to a method for the production of lyocell staple fibers, comprising the steps in the following order: a) extruding filaments from a solution of cellulose in an organic solvent; b) precipitating the cellulose for the formation of continuous cellulose filaments; c) washing the cellulose filaments; d) contacting the cellulose filaments with a crosslinking agent; e) reacting the cellulose filaments with the crosslinking agent in a reaction chamber; f) wash- (Continued)

ing the treated cellulose filaments; g) cutting the washed cellulose filaments into staple fibers; h) forming a nonwoven fleece from the staple fibers and pressing the nonwoven fleece; and i) finishing the nonwoven fleece and pressing the nonwoven fleece.

15 Claims, 2 Drawing Sheets

(51) Int. Cl.
    *D01F 11/02*     (2006.01)
    *D04H 1/4258*     (2012.01)
    *B29K 1/00*     (2006.01)

(52) U.S. Cl.
    CPC ...... *B29K 2001/08* (2013.01); *D10B 2201/22* (2013.01)

(56) References Cited

U.S. PATENT DOCUMENTS

| | | | |
|---|---|---|---|
| 5,409,532 A | | 4/1995 | Astegger et al. |
| 5,562,739 A | | 10/1996 | Urben |
| 5,580,354 A | | 12/1996 | Taylor |
| 5,589,125 A | * | 12/1996 | Zikeli .................... D01D 10/00 264/211.13 |
| 5,601,765 A | | 2/1997 | Sellars et al. |
| 5,779,737 A | | 7/1998 | Potter et al. |
| 5,833,018 A | | 11/1998 | von Gynz-Rekowski |
| 5,882,356 A | * | 3/1999 | Potter ................. D06M 13/358 8/546 |
| 5,968,434 A | | 11/1999 | Zikeli et al. |
| 6,022,378 A | | 2/2000 | Eibl |
| 6,117,378 A | | 9/2000 | Eibl et al. |
| 6,235,392 B1 | * | 5/2001 | Luo .......................... D21C 9/10 264/211.13 |
| 6,241,933 B1 | | 6/2001 | Köll et al. |
| 7,067,444 B2 | * | 6/2006 | Luo ........................ D21C 9/004 442/337 |
| 7,951,237 B2 | | 5/2011 | Zikeli et al. |
| 10,883,196 B2 | * | 1/2021 | Schrempf ................. D01F 2/00 |
| 11,898,273 B2 | * | 2/2024 | Silbermann ............... D01F 2/00 |
| 2005/0189675 A1 | * | 9/2005 | Redlinger ................. C08L 1/02 264/234 |
| 2007/0105469 A1 | | 5/2007 | Manner et al. |
| 2010/0289177 A1 | | 11/2010 | Redlinger et al. |
| 2011/0212150 A1 | | 9/2011 | Redlinger et al. |
| 2016/0326671 A1 | | 11/2016 | Schrempf et al. |
| 2016/0348280 A1 | * | 12/2016 | Schuster ................... C08L 1/02 |
| 2022/0407883 A1 | | 12/2022 | Rao et al. |
| 2024/0229303 A1 | * | 7/2024 | Roder et al. ............ D21H 13/08 |
| 2024/0352626 A1 | * | 10/2024 | Dobson .................. D01F 11/02 |

FOREIGN PATENT DOCUMENTS

| | | |
|---|---|---|
| CN | 203904520 U | 10/2014 |
| CN | 203960407 U | 11/2014 |
| CN | 203999953 U | 12/2014 |
| CN | 204000264 U | 12/2014 |
| CN | 204265902 U | 4/2015 |
| CN | 106757906 A | 5/2017 |
| CN | 108360182 A | 8/2018 |
| DE | 10043297 A1 | 3/2002 |
| EP | 0 538 977 A1 | 4/1993 |
| EP | 0 553 070 A1 | 7/1993 |
| EP | 1315856 B1 | 3/2006 |
| GB | 2373784 A | 10/2002 |
| IN | 203402582 U | 1/2014 |
| WO | 93/19230 A1 | 9/1993 |
| WO | 94/09191 A1 | 4/1994 |
| WO | 94/27903 A1 | 12/1994 |
| WO | 95/24520 A1 | 9/1995 |
| WO | 95/28516 A1 | 10/1995 |
| WO | 9714829 A1 | 4/1997 |
| WO | 97/49856 A1 | 12/1997 |
| WO | 98/28516 A1 | 7/1998 |
| WO | 99/19555 A1 | 4/1999 |
| WO | 2004/007818 A1 | 1/2004 |
| WO | 2010/031091 A1 | 3/2010 |
| WO | 2015/101543 A1 | 7/2015 |
| WO | 2019/170670 A1 | 9/2019 |

OTHER PUBLICATIONS

Rohrer, Christian, Peter Retzl, and Heinrich Firgo. "Lyocell LF—Profile of a fibrillation-free fibre from Lenzing." Lenzinger Berichte 80 (2001): 75-81. (Year: 2001).*
Bisfa, "Testing methods viscose, modal, lyocell and acetate staple fibers and tows," Edition 2004, pp. 46-58.
Holler et al., Melliand Textilberichte, vol. 65, pp. 573-574 (1984).
Roder et al., "Man-made cellulose fibres—a comparison based on morphology and mechanical properties," Lenzinger Berichte, vol. 91, pp. 7-12 (2013).
Stover, "Zur Fasernassscheuerung von Viskosefasern," Faserforschung und Textiltechnik, vol. 19, Edition 10, pp. 447-452 (1968).
Eichiner et al., "Man Made Cellulosic Fibres," Mat. Res. Soc. Symp. Proc. vol. 702, pp. 1-12 (2002).
Reisel, "Co-Application of a Fibrillation Protection Agent and Reactive Dyes to Tencel Classic Fibres," Ph.D. Thesis, Univ. Manchester, pp. 1-244 (2009).
Burrow, "Recent Advances in Chemically Treated Lyocell Fibres," Lenzinger Berichte, vol. 84, pp. 110-115 (2005).
Rath, "Lehrbuch der Textilchemie einschliesslich der textilchemischen Technologie," 3rd Ed., p. 108 (1972).
Denninger et al., "Textil- und Modelexikon," vol. 1, A-K, 8th Ed., pp. 41, 763-764 (2006).
Werz, et al., Lenzinger Berichte, vol. 83, pp. 1-117 (2004).

* cited by examiner

METHOD FOR PRODUCING LYOCELL STAPLE FIBERS

The present application is a national-stage entry under 35 U.S.C. § 371 of International Patent Application No. PCT/EP2020/071378, published as WO 2020/023594 A1, filed Jul. 29, 2020, which claims priority to EP 19189737.0, filed Aug. 2, 2019, the entire disclosure of each of which is hereby incorporated by reference.

BACKGROUND OF THE INVENTION

Field of the Invention

The present invention relates to a method for the production of lyocell staple fibers and to a lyocell staple fiber obtainable by the method according to the invention.

Prior Art

In consequence of the environmental problems associated with the known viscose process for the production of cellulosic fibers, intense efforts have been made in recent decades to provide alternative and more environmentally friendly methods. A particularly interesting possibility which thereby has arisen in recent years is to dissolve cellulose in an organic solvent without a derivative being formed and to extrude moulded bodies from said solution. Fibers spun from such solutions have received the generic name Lyocell from BISFA (The International Bureau for the Standardization of Man-made Fibers), wherein an organic solvent is understood to be a mixture of an organic chemical and water.

Furthermore, such fibers are also known by the term "solvent-spun fibers".

It has turned out that in particular a mixture of a tertiary amine oxide and water is perfectly suitable as an organic solvent for the production of lyocell fibers and other lyocell moulded bodies, respectively. Thereby, N-methylmorpholine-N-oxide (NMMO) is predominantly used as the amine oxide. Other suitable amine oxides are disclosed in EP 0 553 070 A. Ionic liquids are also suitable as organic solvents. Methods for the production of cellulosic moulded bodies from a solution of cellulose in a mixture of NMMO and water are disclosed, for example, in USA 4,246,221 or in WO 93/19230 A. The cellulose solution is thereby extruded from a spinneret, stretched in an air gap and precipitated from the solution in an aqueous precipitation bath. This process is referred to hereinafter as the "amine oxide process" or "lyocell process", with the abbreviation "NMMO" denoting hereinafter all tertiary amine oxides which are able to dissolve cellulose. Fibers produced according to the amine oxide process are characterized by a high fiber strength in the conditioned state as well as in the wet state, a high wet modulus and a high loop strength.

Commercially manufactured lyocell fibers are mainly in the form of staple fibers.

When the spinning solution is extruded through a spinneret, continuous filaments are first formed from the spinning solution. These are precipitated in a spinning bath, whereby continuous cellulose filaments are still being formed. Cutting those cellulose filaments to a discrete length results in staple fibers.

Extensive prior art is known regarding the processing of lyocell fibers after the spinning.

Steps that are necessary in any case for processing the lyocell fibers are as follows (wherein the following list should not be construed as a chronological sequence of the process):
multiple washings thereof;
applying a finish;
taking measures for inducing crimp in the fiber;
one or, if necessary, also several dryings of the fiber;
and cutting of the fibers into staple fibers.

Furthermore, it is known that lyocell fibers have a certain tendency towards fibrillation. Numerous measures have already been proposed against this property, with the treatment of the lyocell fiber with a crosslinking agent being a commercially important procedure.

Suitable crosslinking agents are described, for example, in EP 0 538 977 A, WO 97/49856 A and WO 99/19555 A. Other crosslinking agents are known, for example, from WO 94/09191 A and WO 95/28516 A.

A particularly preferred crosslinking agent is a substance of formula (I)

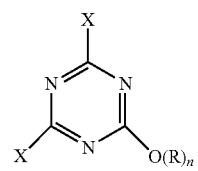

(I)

wherein X represents halogen, R=H or an ionic moiety and n=0 or 1, or, respectively, a salt of this compound. Hereinafter, this substance is also referred to as "NHDT".

Furthermore, the prior art provides different concepts regarding the question as to when the cellulose filaments are cut into staple fibers and, resulting therefrom, in what form (continuous filament or staple fiber which has already been cut) the lyocell fibers undergo the various above-indicated treatment steps.

For example, from WO 94/27903 A and from WO 95/24520 A, a method is known in which the steps of washing and also of inducing a crimp are performed on the still uncut cellulose filaments. This is also referred to as a "tow aftertreatment". The crimp is induced in the fibers in this method by means of a so-called "stuffer box". WO 98/28516 A describes that lyocell fibers can be treated with a crosslinking agent within the scope of a tow aftertreatment.

From WO 97/14829 A, on the other hand, a method is known in which the cellulose filaments are cut into staple fibers immediately after the spinning and the first washing bath.

In the method of WO 97/14829 A, a nonwoven fleece is formed from the staple fibers and a so-called "permanent crimp" is obtained in the fibers by squeezing or, respectively, pressing the nonwoven. The further processing steps up to the first drying of the fibers are passed through in the form of staple fibers or, respectively, in the form of this nonwoven.

In the following, this concept is referred to as a "fleece aftertreatment".

Alternative methods for the production of crosslinked fibers are known from U.S. Pat. No. 5,562,739 A, GB 2 373 784 A, and WO 2004/007818 A1.

Further details regarding the processing of freshly spun fibers are known from CN204265902 (U), CN203960407

(U), CN203904520 (U), CN203403200 (U), CN203402582 (U), CN204000264 (U), CN203999953 (U), CN106757906 (A) and CN108360182 (A).

Particularly in the context of the production of lyocell staple fibers treated with a crosslinking agent (hereinafter referred to as "crosslinked fibers"), problems arise in the known methods of processing the freshly spun fibers, both with regard to the consumption of chemicals and with regard to the efficiency of the method.

BRIEF DESCRIPTION OF THE INVENTION

It is the object of the present invention to provide an improved method for the production of crosslinked lyocell staple fibers.

This object is achieved by a method for the production of lyocell staple fibers, comprising the steps in the following order:

a) extruding filaments from a solution of cellulose in an organic solvent
b) precipitating the cellulose for the formation of continuous cellulose filaments
c) washing the cellulose filaments
d) contacting the cellulose filaments with a crosslinking agent
e) reacting the cellulose filaments with the crosslinking agent in a reaction chamber
f) washing the treated cellulose filaments
g) cutting the washed cellulose filaments into staple fibers
h) forming a nonwoven fleece from the staple fibers and pressing the nonwoven fleece
i) finishing the nonwoven fleece and pressing the nonwoven fleece.

Preferred embodiments are indicated in the dependent claims.

DETAILED DESCRIPTION OF THE INVENTION

Figure 1:
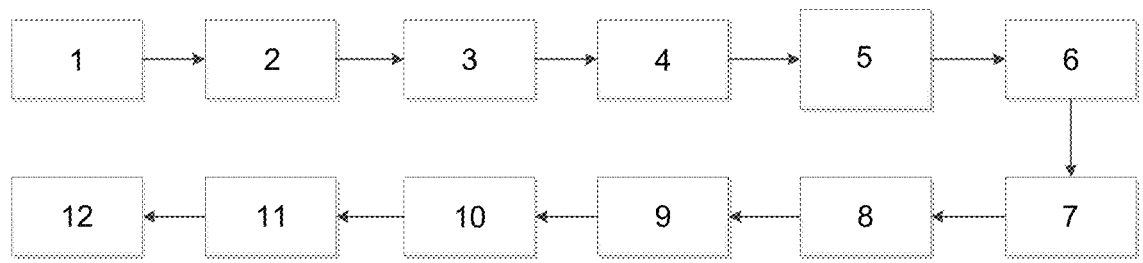
FIG. 1 shows a block diagram to illustrate the sequence of a preferred embodiment of the method according to the invention.

It has surprisingly been found that elements of the two above-mentioned concepts of tow aftertreatment, on the one hand, and of fleece aftertreatment, on the other hand, can be combined in a novel fashion, as a result of which the fiber properties can be improved significantly.

According to the present invention, the first washing of the fibers (for removing the solvent) and the contacting of the fibers with the crosslinking agent, as well as the reaction with the crosslinking agent, are still performed in the form of (continuous) cellulose filaments, that is, in tow form. The cellulose filaments are cut into staple fibers, brought into the form of a nonwoven fleece, pressed and provided with a finish only after a new washing (hereinafter also referred to as a "crosslinker washing").

It has been found that, in comparison to the so-called "fleece aftertreatment", the carrying out of steps c) to f), in particular step e), the treatment with a crosslinking agent, on fibers in tow form results in significant savings in terms of the energy applied and of the chemicals used. This also means that milder conditions as compared to the "fleece aftertreatment" can be used for the treatment of the fiber.

However, due to the final process steps h) and i) in the form of a nonwoven, the fibers furthermore exhibit the valued property of a "permanent crimp".

In line with WO 97/14829, a "permanent crimp" is understood as the presence of, on average, at least two squeezing points per millimetre of filament length, with those squeezing points being preserved also on the dried fiber and being visible as colour changes when viewed under a linearly polarized light. Preferably, this "permanent crimp" is still detectable also after the mechanical stress arising during carding and yarn spinning.

Surprisingly, crosslinked fibers obtainable by the method according to the invention have better fiber data than fibers which are treated with the same crosslinking agent according to the prior art (namely as a fleece or as a tow).

A preferred embodiment of the method according to the invention is characterized in that the filaments or, respectively, the staple fibers are dried for the first time after step i).

The reaction of the cellulose filaments with the crosslinking agent usually occurs at an elevated temperature.

In particular, the reaction in step e) can be carried out with energy input.

Furthermore, the reaction in step e) is preferably carried out in the presence of steam. Of course, other options arise as well, for example, a treatment with electromagnetic rays, in particular in a microwave.

In a preferred embodiment, step e) of the method according to the invention is carried out in a steam chamber. For example, a J-Box can be used for this step.

The duration of step e) can be from 3 to 30 minutes, preferably from 10 minutes to 25 minutes, particularly preferably from 15 to 20 minutes.

The crosslinking agent can be used in such an amount that it results in a content G of crosslinking agent in moles per 1 kg of cellulose atro, which complies with the following formula:

$$G \times R = 0.10\text{-}0.45, \text{ preferably } 0.10\text{-}0.35, \text{ particularly preferably } 0.20\text{-}0.35,$$

wherein R denotes the number of reactive groups in the crosslinking agent. R is at least 2; for the crosslinking agent NHDT with the formula (I), R=2. In case of other crosslinking agents, R may be >2. For example, for the sodium salt of p-[(4,6-dichloro-1,3,5-triazine-2 yl)amino]-benzenesulfonic acid ("SDTB"), which can be used as a crosslinking agent, the following applies: R=3.

For the purposes of this invention, a person skilled in the art understands the term "reactive groups" to refer to groups which are able to enter into covalent bonds with OH groups of cellulose.

The amount required for achieving the desired content of crosslinking agent in the cellulose can be determined by a person skilled in the art within the scope of preliminary tests. Usually, it may be assumed that, in the range from 30% by weight to 70% by weight, in particular 40% by weight to 60% by weight of the crosslinking agent as originally used can be found in the fiber.

The amount of crosslinking agent obtained in the fiber can be determined by analyzing a signature characteristic of the crosslinking agent, e.g., in case of nitrogenous crosslinking agents by using a quantitative nitrogen analysis of the fiber.

In a preferred embodiment, a compound of formula (I)

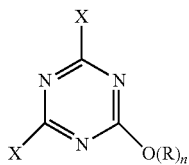

is used as a crosslinking agent in the method according to the invention, wherein X represents halogen, R=H or an ionic moiety and n=0 or 1, or, respectively, a salt of this compound, preferably the sodium salt of 2,4-dichloro-6-hydroxy-1.3.5-triazine. Hereinafter, this compound is abbreviated with the abbreviation "NHDT".

This compound has two reactive groups (two halogen moieties).

The crosslinking agent of the compound of formula (I) is preferably used in an amount of 30-80 g, preferably 45-60 g, per 1 kg of cellulose atro.

The object of the present invention is solved by a lyocell staple fiber obtainable by the method according to the invention described above using the crosslinking agent NHDT and having a permanent crimp and a coefficient of variation ($CV_{NSF}$) of the wet abrasion resistance (NSF) of lower or equal to 50%.

In a preferred embodiment variant, the lyocell staple fiber according to the invention has a $CV_{NSF}$ of lower or equal to 45%, particularly preferably of lower or equal to 40%.

The NSF is a key figure of the fiber's resistance to fibrillation, which occurs during the washing of the textile and is determined according to the testing method indicated in the examples. Based on the good wet abrasion resistances of the fiber according to the invention, also this requirement, which is essential for crosslinked fibers, is met.

The coefficients of variation $CV_{NSF}$ of the fibers are determined according to the measurement method described in the section on examples below.

The low $CV_{NSF}$ values of the fibers in accordance with the invention—as specified above—represent a primary distinguishing feature compared to fibers produced with NHDT by fleece crosslinking. As mentioned above, conventional fleece aftertreatment causes damage to the fibers during the crosslinking reaction, which not only results in a reduction in strength, but also leads to a greater variation in (reduced) strength, since not all cellulose chains are damaged to the same extent. This ultimately results in a higher $CV_{NSF}$ coefficient of variation of wet abrasion resistance.

As shown in Tables 4 and 5 below, according to examples 1 to 8, the fibers according to the invention all have $CV_{NSF}$ values of less than 45%, and a large proportion even have $CV_{NSF}$ values below 40%. Such a low $CV_{NSF}$ is not to be expected from fibers crosslinked with NHDT by fleece aftertreatment. The evaluation of numerous examples of fleece crosslinked fibers (e.g. commercially available lyocell staple fiber of the LENZING™ Lyocell LF type with a titre of 1.7 dtex from Lenzing Aktiengesellschaft, Werkstraße 2, A-4860 Lenzing) has shown that they all have $CV_{NSF}$ values in the range between 60% and 80%.

The object of the present invention is also achieved by a lyocell staple fiber which is obtainable by the method according to the invention using the crosslinking agent NHDT and is furthermore characterized by a combination of the following properties:

the fiber has a titre ranging from 1.2 dtex to 1.5 dtex, preferably from 1.25 dtex to 1.45 dtex,
the fiber has a permanent crimp,
the fiber has a fiber strength in the conditioned state of at least 36 cN/tex, preferably ranging from 38 cN/tex to 42 cN/tex,
the fiber has a Hoeller factor of F1≥2.1, preferably of ≥2.4, particularly preferably ranging from 2.5 to 3.2, and
the fiber has a Hoeller factor of F2≥3.0, preferably of ≥3.5, particularly preferably ranging from 4.0 to 5.5.

Furthermore, the object of the present invention is also achieved by a lyocell staple fiber which is obtainable by the method according to the invention using the crosslinking agent NHDT and is furthermore characterized by a combination of the following properties:

the fiber has a titre ranging from 0.6 dtex to 1.2 dtex, preferably from 0.7 dtex to 1.15 dtex, particularly preferably from 0.8 dtex to 1.1 dtex,
the fiber has a permanent crimp,
the fiber has a fiber strength in the conditioned state of at least 40 cN/tex, preferably ranging from 42 cN/tex to 49 cN/tex, particularly preferably from 43.5 cN/tex to 46 cN/tex,
the fiber has a Hoeller factor of F1≥2.8, preferably of ≥3.0, particularly preferably ranging from 3.2 to 3.5, and
the fiber has a Hoeller factor of F2≥3.0, preferably of ≥3.6, particularly preferably ranging from 3.9 to 5.5.

In a preferred embodiment variant, these fibers, with titres of 0.6 dtex to 1.2 dtex and 1.2 dtex to 1.5 dtex, each have, as described above, a coefficient of variation of wet abrasion resistance $CV_{NSF}$ of less than or equal to 50%, in particular less than or equal to 45%.

There is normally a plurality of fibers in commercially produced fibers. Herein, a person skilled in the art understands the term "titre of a fiber" to refer to the average of several measurements on several fibers, preferably of 20 measurements.

The fiber according to the invention initially differs from crosslinked lyocell fibers available on the market, which are produced by conventional tow aftertreatment, by the above-described property of a permanent crimp.

Compared to lyocell fibers crosslinked with NHDT, which were produced with a fleece aftertreatment, the fiber according to the invention is distinguished in particular by its increased fiber strength in the conditioned state.

Furthermore, the fibers according to the invention differ from lyocell fibers crosslinked with NHDT via fleece aftertreatment in the significantly lower $CV_{NSF}$, as explained above.

In 1984, Holler and Puchegger (*Melliand Textilberichte* 1984, 65, 573-574) introduced a "new method to characterize regenerated cellulose fibers".

The authors provided a graph which reflects the fiber properties on the basis of two calculated factors which are plotted on two axes and generate the so-called "Hoeller-graph", wherein different fiber types claim different areas.

The mechanical textile fiber properties generating these two factors are well-known to experts and can be found and tested in accordance with BISFA "Testing methods viscose, modal, lyocell und acetate staple fibers and tows" ["Prüfverfahren Viskose, Modal, Lyocell und Acetat Stapelfasern und Seile"] Edition 2004, Chapter 7.

The two Hoeller factors F1 and F2 are calculated as described below:

$$F1=-1.109+0.03992*FFk-0.06502*FDk+0.04634*FFn-0.04048*FDn+0.08936*BISFA\text{-}Modulus+0.02748*SFk+0.02559*KFk,$$

und $$F2=-7.070+0.02771*FFk+0.04335*FDk+0.02541*FFn+0.03885*FDn-0.01542*BISFA\text{-}Modulus+0.2891*SFk+0.1640*KFk,$$

wherein
FFk is the fiber strength in the conditioned state,
FDk is the fiber elongation in the conditioned state,
FFn is the fiber strength in the wet state,
FDn is the fiber elongation in the wet state,
BISFA-Modulus is the wet modulus at 5% elongation,
SFk is the loop strength in the conditioned state,
SDk is the loop elongation in the conditioned state, and
KFk is the knot strength in the conditioned state.

According to *Lenzinger Berichte* 2013, 91, 07-12, in the Hoeller graph, fibers from different production processes, e.g. direct dissolution vs derivatization, can be clearly distinguished from each other. Also among the direct dissolution fiber types, fibers which are produced from different direct solvents claim different areas—e.g. fibers spun from solutions in ionic liquids or, on the other hand, NMMO.

Commercial lyocell fibers (not crosslinked) exhibit Hoeller F1 values of between 2 and 3 and Hoeller F2 values of between 2 and 8 (WO 2015/101543 and *Lenzinger Berichte* 2013, 91, 07-12). Fibers produced from direct solutions in ionic liquids cover an area of Hoeller F1 values between 3 and 5.5 and Hoeller F2 values between 7 and 10.5 (*Lenzinger Berichte* 2013, 91, 07-12). WO 2015/101543 discloses a new lyocell fiber type with Hoeller F2 values in a lower range between 1 and 6 and Hoeller F1 values between −0.6 and a right upper margin which is defined by F2−4.5*F1≥3, in particular ≥1.

Thus, WO 2015/101543 describes a (non-crosslinked) lyocell fiber with a specific location within the Hoeller graph. The lyocell fibers claimed were produced using mixtures of high-quality wood pulps with high α-content and low non-cellulose contents, such as hemicelluloses, to reach a specific molecular weight distribution and optimized spinning parameters. The air gap influence is reduced, spinning is performed at high temperatures and by employing lower drawing ratios. This fiber is characterized by an increased wet abrasion resistance, although it is not crosslinked.

Further forms of non-crosslinked lyocell fibers in other areas of the Hoeller graph are disclosed in WO 2019/170670 A1.

The fibers according to the invention have Hoeller factors of F1≥2.1 and F2≥3.0 for titres ranging from 1.2 dtex to 1.5 dtex, and Hoeller factors of F1≥2.8 and F2≥3.0 for titres ranging from 0.6 dtex to 1.2 dtex. A crosslinked lyocell fiber with such high Hoeller factors F1 and F2, in relation to the respective titre, has not yet been described.

In the following table, values for the textile parameters relevant for determining the Hoeller factors are summarized for a few examples of lyocell fibers A-H:

TABLE 1

| Fiber | A | B | C | D | E | F | G | H |
|---|---|---|---|---|---|---|---|---|
| Method and crosslinker | tow (other) | tow (NHDT) | fleece (NHDT) | fleece (NHDT) | — | — | invent. (NHDT) | invent. (NHDT) |
| Titre [dtex] | 1.47 | 1.34 | 1.36 | 0.93 | 1.36 | 0.98 | 1.38 | 0.92 |
| FFk. [cN/tex] | 35.9 | 36.6 | 32.9 | 31.7 | 37.5 | 41.1 | 39.6 | 44.5 |
| FDk. [%] | 10.2 | 9.9 | 9.3 | 7.9 | 12.3 | 15.6 | 10.1 | 11.2 |
| FFn. [cN/tex] | 23.9 | 24.6 | 25.8 | 27.6 | 30.9 | 39.2 | 27.4 | 35 |
| FDn. [%] | 10.4 | 10.5 | 11.9 | 11 | 16.3 | 20.1 | 10.9 | 11.9 |
| BISFA-Modulus [cN/tex/5%] | 10.7 | 10.6 | 9.7 | 10.4 | 9.6 | 10.2 | 11.4 | 14.2 |
| SFk. [cN/tex] | 9.3 | 10.2 | 12 | 12 | 16.3 | 23 | 15.5 | 14 |
| SDk. [%] | 1.5 | 1.4 | 2.4 | 2.8 | 3.7 | 6.1 | 2.8 | 1.9 |
| KFk. [cN/tex] | 18.7 | 19.3 | 21.4 | 20.7 | 28.1 | 33.4 | 26.2 | 26.5 |
| Hoeller factor F1 | 2 | 2.1 | 2.1 | 2.3 | 2.4 | 2.9 | 2.8 | 3.4 |
| Hoeller factor F2 | 0.9 | 1.4 | 2.2 | 2 | 5.1 | 8.5 | 4.2 | 4.2 |

Fiber A is a commercially available crosslinked fiber, produced as per the conventional tow aftertreatment with a mechanical crimp, which has been treated with a crosslinker different from the crosslinker used for the production of the fiber according to the invention.

Fiber B is a commercially available crosslinked lyocell fiber which has been treated with the same crosslinker as the fiber according to the invention. However, fiber B was likewise produced according to the tow aftertreatment.

Fiber C is a fiber which has been produced according to the fleece aftertreatment and has been treated with the same crosslinker as the fiber according to the invention and is commercially available.

Fiber D, like fiber C, is a microfiber produced via fleece aftertreatment and treated with the same crosslinker as the fiber according to the invention, which differs significantly from fiber C in its lower titre.

For another comparison, fiber E, a non-crosslinked standard lyocell fiber, has been mentioned. By way of this comparison, it is possible to deduce what kind of influence the crosslinking process has on the textile parameters.

Likewise fiber F, a non-crosslinked lyocell microfiber, was also indicated. This fiber is also suitable for comparison with crosslinked microfibers or for determining the influence of the crosslinking process on the textile parameters of microfibers.

The above-indicated Table 1 shows the Hoeller factors of the fibers G and H according to the invention. Thereby, fiber G is a fiber with a titre in the range of the non-inventive fibers A, B, C and E. Fiber H is a microfiber with a titre in the range of the non-inventive fibers D and F. According to Table 1, the Hoeller factors of the fibers according to the invention differ strongly from the Hoeller factors of the other crosslinked lyocell fibers A-D, as well as from the Hoeller factors of the non-crosslinked lyocell fibers E and F, in particular also compared to fibers in the respective equal titre range.

Figure 3:
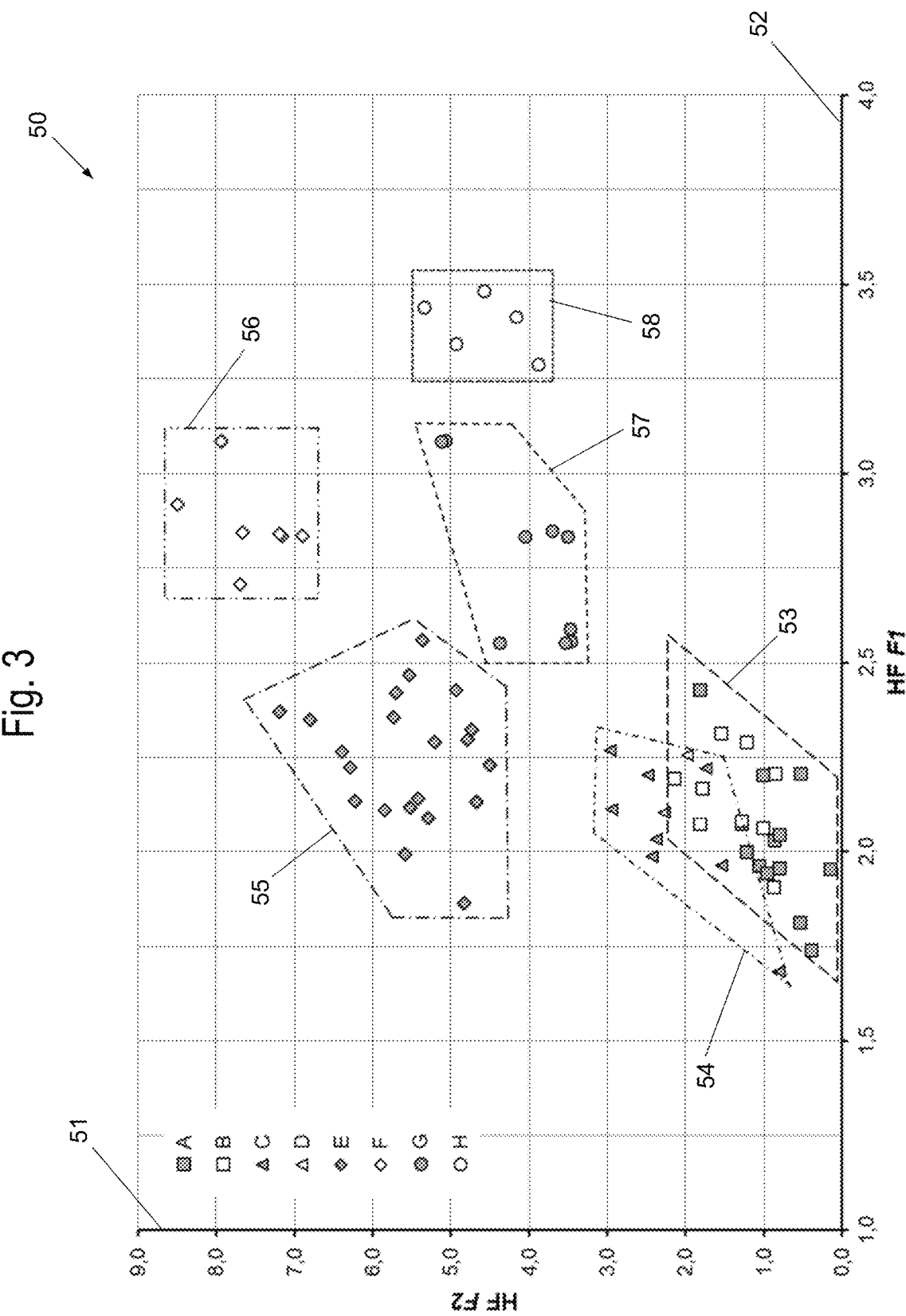
FIG. 3 shows a comparison of the Hoeller factors of prior art lyocell fibers and of lyocell staple fibers according to the invention.

Graphically, the differences in the Hoeller factors F1 and F2 can be seen even more clearly in FIG. 3, in which the results of numerous measurements on fibers of the types A to H are depicted.

The fibers according to the invention thus exhibit a very high strength.

Especially in a conventional fleece aftertreatment, the fiber strength decreases strongly as a result of damage during the crosslinking reaction, as shown on the basis of fiber C and D. The damage occurs due to hydrolytic cleavage of the cellulose chains. The shorter chains resulting therefrom reduce the fiber strength.

Conversely, in addition to a lack in permanent crimp, fibers produced according to the tow aftertreatment exhibit the disadvantage that the fiber becomes very brittle, regardless of the crosslinker's chemistry. This is evident from the lower loop and knot strengths of fibers A and B. In this case, the fibers G and H according to the invention produce excellent values, which means that the problem of embrittlement does not occur, with the result of a significantly higher Hoeller factor F2.

Most notably, the Hoeller factor F1 increases also in comparison to the standard fibers (fibers E and F), since the weighting of the fiber elongation in the dry and wet states (FDk, FDn) is negative therein. Especially the wet elongation (FDn) decreases strongly due to the crosslinking of the fiber.

In addition, the loop elongation (SDk) is also of importance. Similarly, a low loop elongation is tantamount to a brittle fiber. Brittle fibers lead to poorer processability, which, among other things, is due to the formation of dust in the yarn spinning process.

The fibers according to the invention are superior to a commercially available lyocell fiber crosslinked with NHDT also in terms of their fiber elongation in the conditioned state (FDk). The fiber elongation in the conditioned state (FDk) of the fibers according to the invention is preferably 10% and more, particularly preferably 10% to 11%.

As a result of such properties, the fibers according to the invention preferably have a working capacity of 380%*cN/tex and more. The working capacity as illustrated in Table 2 results from the multiplication of fiber strength FFn [cN/tex] and elongation FDk [%].

TABLE 2

| Fiber | A | B | C | D | E | F | G | H |
|---|---|---|---|---|---|---|---|---|
| Method and crosslinker | tow (other) | tow (NHDT) | fleece (NHDT) | fleece (NHDT) | — | — | invent. (NHDT) | invent. (NHDT) |
| Titre [dtex] | 1.47 | 1.34 | 1.36 | 0.93 | 1.36 | 0.98 | 1.38 | 0.92 |
| FFk. [cN/tex] | 35.9 | 36.6 | 32.9 | 31.7 | 37.5 | 41.1 | 39.6 | 44.5 |
| FDk. [%] | 10.2 | 9.9 | 9.3 | 7.9 | 12.3 | 15.6 | 10.1 | 11.2 |
| Working capacity [% cN/tex] | 366 | 362 | 306 | 250 | 460 | 641 | 400 | 498 |

In comparison to commercially produced fibers crosslinked with NHDT, the fibers according to the invention also have an increased nitrogen content with the amount of crosslinking agent being the same, i.e., the efficiency of the crosslinking reaction is higher.

Furthermore, the fibers according to the invention are preferably characterized by a wet abrasion resistance (NSF) of 300 revolutions/dtex (r/dtex) or more, preferably 400 r/dtex or more, particularly preferably 450 r/dtex or more. A non-crosslinked lyocell fiber has an NSF of approximately 40 to 80 r/dtex.

The content G of crosslinking agent in moles per 1 kg of cellulose atro in the fiber according to the invention preferably complies with the following formula:

$$G \times R = 0.10\text{-}0.45, \text{ preferably } 0.10\text{-}0.35, \text{ particularly preferably } 0.20\text{-}0.35,$$

wherein R, as already defined above, denotes the number of reactive groups in the crosslinking agent.

Particularly preferably, the content of the crosslinking agent of the compound of formula (I) amounts to 2.0-3.0 wt.-%, based on cellulose atro.

The present invention also relates to a fiber bundle containing at least 20 kg of a lyocell staple fiber according to the invention. The present invention thus provides the fiber according to the invention in commercial quantities.

Such quantities of a lyocell staple fiber would not be producible with a laboratory system with only one or only a few spinnerets and, in particular, only a few spinning holes, as used for scientific research.

Conversely, there are, of course, significant differences between such a laboratory system and a commercial production regarding the problem of the manufacturability of fibers with certain textile parameters.

The present invention also relates to a textile article containing a lyocell staple fiber according to the invention.

The textile article is preferably provided in the form of a yarn. In any case, the production of a yarn also requires a quantity of fibers, that is to say, at least a few kg of fibers, which would not be producible with a laboratory system as described above.

In the following Table 3, the yarn data of two fiber bales (comparative bales 1 and 2) of a commercially produced fiber C are exemplified in comparison to one bale each of the fiber G according to the invention, which has been produced according to Examples 2 and 5, as indicated further below.

TABLE 3

| Example | Comparative bale 1 | Comparative bale 2 | Example 2 | Example 5 |
|---|---|---|---|---|
| Thin spots [−50%/km] | 2 | 5 | 1 | 0 |
| Thick spots [+50%/km] | 18 | 28 | 15 | 8 |
| Nits [+140%/km] | 161 | 225 | 151 | 106 |
| Nits [+200%/km] | 32 | 34 | 37 | 23 |
| Strength [cN/tex] | 21 | 20.2 | 26.8 | 24.2 |
| Elongation [%] | 7 | 6.6 | 8.1 | 7.9 |
| Dust [ppm] | 500 | 460 | 254 | 135 |

In addition to the higher yarn strengths and yarn elongations, the bales made of the fiber according to the invention obtain improved product quality on the basis of the smaller number of thick and thin spots as well as nits. The dust value is also reduced due to the reduced brittleness of the fiber as described. The processability of the fiber on the yarn spinning machine is thereby improved.

DETAILED DESCRIPTION OF THE FIGURES

FIG. 1 is a block diagram of the process steps as they are carried out for the production of a preferred embodiment of the fibers according to the invention. The first washing of the fibers (for removing the solvent) and the contacting of the fibers with the crosslinking agent, as well as the reaction with the crosslinking agent, are still carried out in the form of (continuous) cellulose filaments, i.e., in tow form. The cellulose filaments are cut into staple fibers only after the crosslinker washing. The individual steps are listed chronologically below:
a) production of the spinning dope;
b) fiber spinning comprising the extrusion of filaments from a solution of cellulose in an organic solvent and the precipitation of the cellulose in order to form continuous cellulose filaments;
c) washing the cellulose filaments by means of tow washing;
d) impregnation by contacting the cellulose filaments with a crosslinking agent;
e) reaction of the cellulose filaments with the crosslinking agent in a reaction chamber;
f) crosslinker washing by washing the treated cellulose filaments;
g) cutting the washed cellulose filaments into staple fibers;
h) forming a nonwoven fleece from the staple fibers;
i) dewatering by pressing the nonwoven fleece;
j) finishing the nonwoven fleece and pressing the nonwoven fleece once more;
k) drying;
l) production of a fiber bale.

Figure 2:
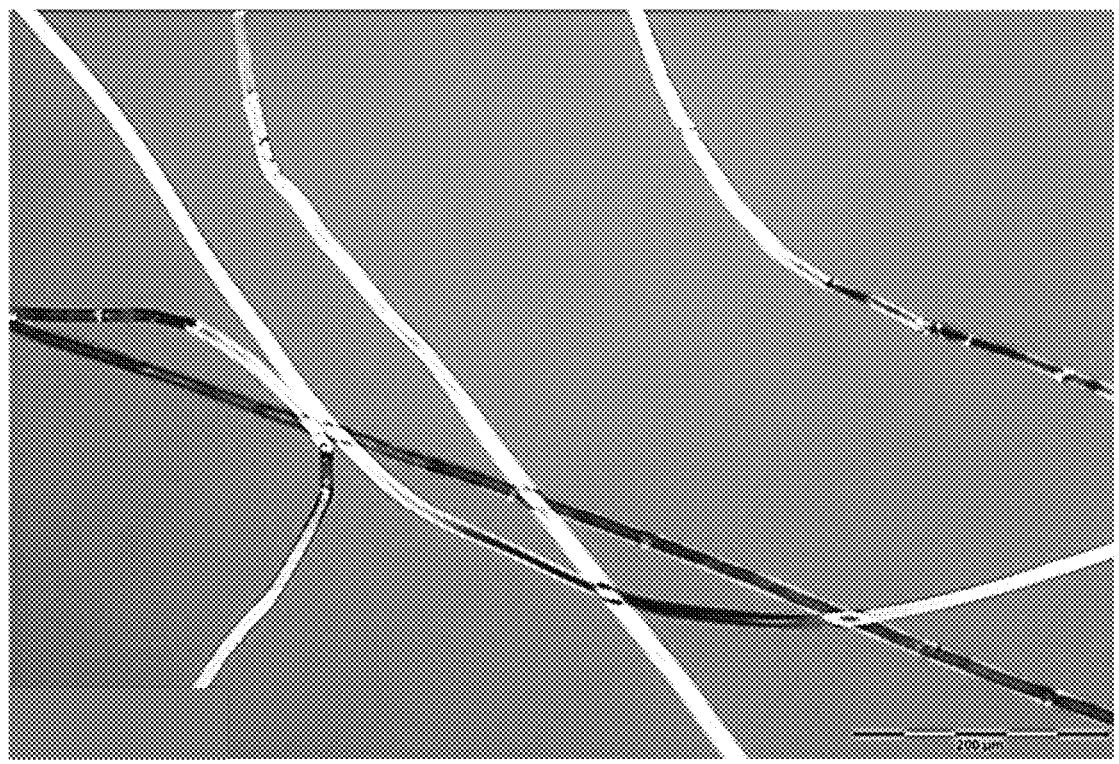
FIG. 2 shows an image of a lyocell staple fiber according to the invention under a light microscope with polarized light.

FIG. 2 shows a polarization micrograph of a preferred embodiment of a lyocell staple fiber according to the invention (Example 1 from Table 4, below). By means of linearly polarized light, the irregular squeezing points are visualized which are preserved on the dried fiber also during the yarn spinning. In line with WO 97/14829, a "permanent crimp" is understood as the presence of, on average, at least two squeezing points per millimetre of filament length. The fibers in FIG. 2 have the valued property of a "permanent crimp", which results from the final process steps h) and i) of the method according to the invention (respectively the process steps 9-11 in FIG. 1). The microcrimp of the lyocell staple fiber of FIG. 2 amounts to 107/2 cm.

FIG. 3 shows a Hoeller diagram 50 with a comparison of the Hoeller factors F1 and F2 of prior art lyocell fibers and of preferred embodiments of the lyocell staple fibers according to the invention.

The diagram 50 is the result of measurements on fibers of the types fiber A to fiber H. Reference should be made to Table 1 and the associated description of fibers A to H. The axes 51 and 52 apply the Hoeller factors F1 and F2 respectively. The diagram 50 can then be divided into several areas 53 to 58, where area 53 comprises the points of fibers A and B, area 54 the points of fibers C and D, area 55 the points of fiber E, and area 56 the points of fiber F. The fibers G (region 57) and H (region 58) according to the invention are clearly delimited from the other regions 53 to 56.

EXAMPLES

Examples 1-5

Continuous cellulose filaments were spun on a semi-commercial pilot plant in a manner known per se to form a fiber tow and were washed continuously by tow washing to render them NMMO-free. After the tow washing, the fiber tow was pressed to minimize the carryover of wash water into the subsequent impregnation bath. The impregnation bath contained the crosslinker (NHDT) and was continuously strengthened with a crosslinker from a strong bath. Upon contacting with the crosslinking agent, the sodium hydroxide solution was applied in a further bath. The sodium hydroxide bath was also continuously strengthened with sodium hydroxide solution in order to keep a suitable concentration constant over an extended period of time.

This bath was cooled to 10° C. in order to reduce side reactions. The fiber tow modified in this way was then guided into a steam chamber, which was designed in the form of a J-box.

The residence time could be measured by means of a corresponding marking on the tow and a stopwatch.

The fiber tow was pulled out of the J-Box and supplied to a crosslinker washing so as to remove excess chemicals. Thereupon, the tow was fed to a cutting tower in order to form staple fibers. The fiber staples were rinsed with water and supplied to the formation of a nonwoven fleece. After the nonwoven fleece had been formed, the nonwoven fleece was pressed and supplied to a finish. The finished nonwoven fleece was pressed again, opened by a nonwoven fleece separator, dried to a finished fiber in a suitable dryer and then supplied to a baling press.

In the following Table 4, test parameters of a few trials (examples 1-5) for the production of fibers with a titre in the range of approx. 1.35 dtex according to the invention are summarized. The experiments show the influence of different essential production parameters, namely NHDT dosage, lye bath concentration and residence time.

TABLE 4

| Example | 1 | 2 | 3 | 4 | 5 |
|---|---|---|---|---|---|
| Production parameters: | | | | | |
| Fiber quantity produced [kg/h] | 56 | 75 | 64.4 | 61.3 | 61.3 |
| NHDT dosage [kg/h] | 4.4 | 5.0 | 4.2 | 4.6 | 4.6 |
| Lye bath concentration [g/l] | 15 | 17 | 14 | 11 | 12.5 |
| Residence time [min] | 19 | 12 | 18 | 18 | 18 |
| Nitrogen charge [%] | 0.636 | 0.477 | 0.589 | 0.629 | 0.592 |
| G × R [mol/kg] | 0.303 | 0.227 | 0.280 | 0.300 | 0.282 |
| Textile parameters: | | | | | |
| Fiber titre [dtex] | 1.40 | 1.38 | 1.41 | 1.32 | 1.32 |
| Strength [cN/tex] | 39 | 38.4 | 38.7 | 38.2 | 38.5 |
| Elongation [%] | 10.5 | 10.2 | 10.8 | 10.6 | 9.9 |
| Microcrimp [#/2 cm] | 107 | 89 | 95 | 117 | 102 |
| NSF [r/dtex] | 612 | 538 | 435 | 570 | 665 |
| $CV_{NSF}$ [%] | 28 | 33 | 35 | 41 | 42 |

In Example 2, the residence time was reduced by increasing the production speed. It is shown that a crosslinked fiber can be produced similarly, but a lower nitrogen charge is achieved.

The following Table 5 again shows test parameters of a few trials (examples 6-8) for the production of microfibers according to the invention with titres in the range of approx. 0.9 dtex. The production parameters NHDT dosage, lye bath concentration and residence time remained essentially constant during the tests. The test data thus show the natural, production-related variation of the textile parameters of the fibers produced by the process according to the invention.

TABLE 5

| Example | 6 | 7 | 8 |
|---|---|---|---|
| Production parameters: | | | |
| Fiber quantity produced [kg/h] | 45 | 45 | 45 |
| NHDT dosage [kg/h] | 4.9 | 4.9 | 4.9 |
| Lye bath concentration [g/l] | 13.7 | 14 | 14.1 |
| Residence time [min] | 18 | 17.5 | 18 |
| Nitrogen charge [%] | 0.620 | 0.634 | 0.635 |
| G × R [mol/kg] | 0.303 | 0.227 | 0.280 |
| Textile parameters: | | | |
| Fiber titre [dtex] | 0.95 | 0.92 | 0.92 |
| Strength [cN/tex] | 45.4 | 43.8 | 44.5 |
| Elongation [%] | 12.5 | 10.7 | 11.2 |
| NSF [r/dtex] | 471 | 425 | 413 |
| $CV_{NSF}$ [%] | 33 | 38 | 44 |

All examples 1-8 show, irrespective of the titre of the fibers produced, that the coefficient of variation of wet abrasion resistance $CV_{NSF}$ is below 45% in each case, or even below 40% in the majority of the examples.

In principle, the technology according to the invention is also suitable for various other modifications on a fiber strand, such as, for example, for the application of a reactive dye and subsequent crosslinking thereof.

However, the technology according to the invention is also generally suitable for the application of other modifiers than crosslinking agents, such as, for example, chitosan (WO 2010/031091 A1).

Apart from the above-described crosslinking agent NHDT, other crosslinking agents such as the crosslinking agents described in the documents mentioned above in this regard, or also other reactive resins, for example single or multi-component systems, which harden due to the influence of atmospheric humidity, oxygen or temperature, in particular epoxies, acrylates, polyurethanes and similar compounds, can also be used. In particular, the necessary conditions can be adjusted very easily for the application of the chemicals. For example, the impregnation bath can also be heated. The reaction chamber can also be adapted to the respective required temperatures or residence times.

Testing Methods

Determination of Wet Abrasion Resistance (NSF)

The wet abrasion resistance (NSF) is a key figure of the resistance of the fiber towards fibrillation. This key figure was determined using the wet abrasion method, which is described in "Zur Fasernassscheuerung von Viskosefasern", Faserforschung and Textiltechnik 19 (1968), Edition 10, pages 447-452. In this process, the fibers rotate on a damp roller and are rubbed off. The number of revolutions until the fiber tears in half is determined.

The abrasion resistance of single fibers preloaded by a preloading weight in the wet state is determined by means of a rotating steel shaft covered with a filament hose (viscose filament stocking). The number of revolutions until the fiber is worn through and torn off is counted and related to the respective fiber titre.

To calibrate the measurement, or to ensure that wear on the filament stocking does not affect the measurement, the wet abrasion resistance of a calibration fiber is determined at regular intervals, in particular at least daily. The calibration measurements should preferably not deviate by more than 20% from the long-term average value of all calibration measurements with a new filament stocking, otherwise the filament stocking must be replaced. Within the scope of the present invention, lyocell staple fibers crosslinked with TAHT (for example produced according to a process as described in WO 95/28516) of the type LENZING™ Lyocell A100 of Lenzing AG, Werkstraße 2, A-4860 Lenzing, with a titre of 1.3 dtex were used for calibration. The long-term average value of the wet abrasion resistance NSF of all calibration measurements of this fiber amounted to 471 r/dtex.

The wet abrasion resistance was determined by means of the device "Delta 100" of Lenzing Instruments. The steel shaft was continuously shifted in the longitudinal direction during the measurement in order to avoid grooves in the filament hose.

The source of supply for the filament hose (viscose filament stocking) was: VOM BAUR GmbH & KG. Markstraße 34, D-42369 Wuppertal.

From 20 tufts of fibers, one fiber with a length of 38 mm is, in each case, placed on the steel shaft with a thickness of 1 cm and is weighed down with the preloading weight. The steel shaft covered with the filament hose is moistened continuously during rotation. During the measurement, the steel shaft is turned at a speed of 500 revolutions per minute and, at the same time, it is moved backwards and forwards diagonally to the fiber axis, resulting in a pendulum motion of approximately 1 cm.

The number of revolutions until the fibers are worn through and the preload weight touches a contact was determined. After 5000 revolutions, the measurement is to be stopped in any case to avoid faulty measurement values. The measured wet abrasion resistance NSF results from the average of all 20 measurements of the number of revolutions divided by the respective fiber titre [r/dtex].

Test Parameters:
Water flow rate: 8.2 mL/min
Speed of rotation: 500 rpm
Abrasion angle: 40°
Preload weight: 50 mg
200 r/dtex or more, especially 400 r/dtex or more, constitute a low fibrillating (LF) fiber or, respectively, a fiber which is resistant to fibrillation in conventional wet processes.

Determination of the Coefficient of Variation $CV_{NSF}$ of Wet Abrasion Resistance The $CV_{NSF}$ of the lyocell staple fiber according to the invention is the ratio between the standard deviation $\sigma_{NSF}$ and the expected value $\mu_{NSF}$ of the wet abrasion resistance (NSF):

$$CV_{NSF} = \sigma_{NSF}/\mu_{NSF}.$$

Since only measurements on samples with a limited sample size can be used to determine the wet abrasion resistance, the mean value over the measurements of the random sample NSF* is used as an approximation to the expected value $\mu_{NSF}$. The approximated $CV_{NSF}$ is thus obtained by normalizing the standard deviation $s_{NSF}$ with the mean value NSF*:

$$CV^*_{NSF} = s_{NSF}/NSF^*.$$

For sample sizes $n \to \infty$ the $CV^*_{NSF}$ determined from the random sample converges against the $CV_{NSF}$ determined from the expected value.

If the sample size is insufficiently small, or if the sample is unsuitable—e.g. if fibers are taken from only one part of the sample—the determined $CV^*_{NSF}$ can thus deviate significantly from the $CV_{NSF}$.

Accordingly, in order to determine a meaningful value of the coefficient of variation $CV_{NSF}$ of a lyocell staple fiber, a sufficiently large sample of fibers from a sufficiently large sample (e.g. a fiber bale) should be used to determine the respective NSF. For this purpose, it is preferable to take fiber tufts from different places in a sample and determine the NSF of each individual fiber from the fiber tuft as described above. In this way, at least 20 fiber tufts from different places in the bale are used and the mean value NSF* and the coefficient of variation $CV_{NSF}$ are determined from these 20 measurements.

As a check, a further sample of fibers from at least 20 different fiber tufts, again taken from the sample independently of the previously selected fiber tufts, is examined. The mean value NSF* and the coefficient of variation $CV^*_{NSF}$ are then calculated from all previously determined NSF values of all samples. If the average NSF* or the coefficient of variation $CV_{NSF}$ thus obtained differs by more than 10%, and in particular by more than 5%, from the values previously determined for the first sample, the procedure described above must be repeated until sufficient convergence of the determined values is obtained.

Depending on the homogeneity of the sample to be examined, a total random sample of more than 100 fibers, and in some cases more than 1000 fibers, may be necessary in this way to determine the coefficient of variation.

Nitrogen Analyzer for Determining the Nitrogen Charge by Burning Up the Sample

The nitrogen charge on the fiber is determined by measuring the N content (e.g., using the LECO FP 328 nitrogen analyzer) by burning up the sample. The amount of crosslinker can be determined from this.

Microcrimp Counting

Fibers were removed at various locations from a fiber sample removed from a fiber bale in order to obtain a composite sample. A drop of glycerin was put on a slide, and some individual fibers from the composite sample were placed as straight as possible therein. A coverslip was placed on the drop of glycerin containing some individual fibers. The slide was placed under a polarization microscope. The microcrimp was counted in the area of the coverslip (2×2 cm).

Dust Test (Yarn)

Dust formation in the yarn spinning process is induced, for example, by brittle fibers and their poorer processability. The dust formation was measured on a pilot plant. The fibers to be tested were rewound. About 500 g of yarn was rewound at a bobbin speed of 1000 m/min. The amount of yarn that had been rewound was determined to the nearest 1 mg. The fiber dust arising in the process was collected and weighed to the nearest 0.1 mg using an analytical balance. The amount of fiber dust specifies the degree of mechanical damage done to the fiber during processing in the yarn spinning mill. The higher the amount of dust [ppm], the more sensitive is the fiber during processing.

The following formula was used for the calculation:

Dust in ppm=(weighted fiber dust [g]*1,000,000)/ rewound amount of yarn [g]

For example: 97.83 ppm=(0.0520 g*1,000,000)/531.512 g

Thin/Thick Spots and Nits

Yarns can have various surface irregularities, such as, for example, thin spots, thick spots and nits. The test for thin and thick spots as well as nits was carried out using the following steps. The yarn to be tested was checked using a USTER® tester. Said tester employs a capacitive method for determining the variability in the weight of a fiber strand, thus drawing conclusions about irregularities on the surface. An average of the yarn weight was determined on the basis of the first 100 m of the yarn. The subsequent 1000 m of the yarn was measured in pieces of 1 cm. The deviation from the average as measured initially was recorded. The number of deviations (−50% for thin spots/+50% for thick spots/+ >100% for nits) was counted. Nits are thick spots which are shorter than 1 cm and exhibit a deviation of the yarn weight from the average of the yarn weight of >100%. The USTER® Tester usually specifies how many nits arise with deviations of >140% or, respectively, >200% (see Table 3).

What is claimed is:

1. A method for producing lyocell staple fibers, comprising the steps in the following order:
   a) extruding filaments from a solution of cellulose in an organic solvent;
   b) precipitating the cellulose to form continuous cellulose filaments;
   c) washing the cellulose filaments;
   d) contacting the cellulose filaments with a crosslinking agent;
   e) reacting the cellulose filaments with the crosslinking agent in a reaction chamber;
   f) washing the treated cellulose filaments;
   g) cutting the washed cellulose filaments into staple fibers;
   h) forming a nonwoven fleece from the staple fibers and pressing the nonwoven fleece; and
   i) finishing the nonwoven fleece and pressing the nonwoven fleece.

2. The method according to claim 1, wherein the cellulose filaments or the staple fibers are dried for the first time after step i).

3. The method according to claim 1, wherein step e) is carried out with energy input.

4. The method according to claim 3, wherein step e) is carried out in the presence of steam.

5. The method according to claim 4, wherein step e) is carried out in a steam chamber.

6. The method according to claim 1, wherein a duration of step e) is from 3 to 30 minutes.

7. The method according to claim 6, wherein the duration of step e) is from 10 minutes to 25 minutes.

8. The method according to claim 6, wherein the duration of step e) is from 15 to 20 minutes.

9. The method according to claim 1, wherein the crosslinking agent is used in such an amount resulting in a content G of crosslinking agent in moles per 1 kg of cellulose atro, which complies with the following formula:

$$G \times R = 0.10 - 0.45,$$

wherein R denotes the number of reactive groups in the crosslinking agent.

10. The method according to claim 9, wherein the crosslinking agent is used in such an amount resulting in the content G of crosslinking agent in moles per 1 kg of cellulose atro, which complies with the following formula:

$$G \times R = 0.10 - 0.35.$$

11. The method according to claim 9, wherein the crosslinking agent is used in such an amount resulting in the content G of crosslinking agent in moles per 1 kg of cellulose atro, which complies with the following formula:

$$G \times R = 0.20 - 0.35.$$

12. The method according to claim 1, wherein a compound of formula (I)

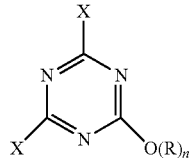

(I)

or a salt thereof is used as a crosslinking agent, wherein X represents a halogen, R represents hydrogen or an ionic moiety, and n=0 or 1, or, respectively, a salt of this compound.

13. The method according to claim 12, wherein the crosslinking agent of the compound of formula (I) is used in an amount of 30-80 g, per 1 kg of cellulose atro.

14. The method according to claim 12, wherein the salt of the compound of Formula I is a sodium salt of 2,4-dichloro-6-hydroxy-1.3.5-triazine.

15. The method according to claim 13, wherein the crosslinking agent of the compound of formula (I) is used in an amount of 45-60 g, per 1 kg of cellulose atro.

* * * * *